(12) United States Patent
Durse et al.

(10) Patent No.: US 12,237,658 B2
(45) Date of Patent: Feb. 25, 2025

(54) BUS BAR ASSEMBLY WITH PLATED ELECTRICAL CONTACT SURFACE

(71) Applicant: Aptiv Technologies AG, Schaffhausen (CH)

(72) Inventors: Nicholas A. Durse, Youngstown, OH (US); Andrew Bohan, Tallmadge, OH (US); Jacob Martin, Olmstead, OH (US); Jonathan Weidner, Conneautville, PA (US)

(73) Assignee: Aptiv Technologies AG, Schaffhausen (CH)

( * ) Notice: Subject to any disclaimer, the term of this patent is extended or adjusted under 35 U.S.C. 154(b) by 298 days.

(21) Appl. No.: 17/852,854

(22) Filed: Jun. 29, 2022

(65) Prior Publication Data

US 2023/0036434 A1 Feb. 2, 2023

Related U.S. Application Data

(60) Provisional application No. 63/270,670, filed on Oct. 22, 2021, provisional application No. 63/226,925, filed on Jul. 29, 2021.

(51) Int. Cl.
*H02G 5/00* (2006.01)
(52) U.S. Cl.
CPC ............. *H02G 5/005* (2013.01); *H02G 5/007* (2013.01)
(58) Field of Classification Search
CPC ......... H01R 13/03; H02G 5/005; H02G 5/007
USPC ......................................... 439/886, 887, 931
See application file for complete search history.

(56) References Cited

U.S. PATENT DOCUMENTS

| 2,017,493 | A | * | 10/1938 | Glowacki | ............ | H01H 85/143 |
| | | | | | | 411/902 |
| 6,902,434 | B2 | | 6/2005 | Stack | | |
| 8,303,357 | B2 | * | 11/2012 | Kuwahara | ........... | H01M 50/503 |
| | | | | | | 439/444 |
| 8,480,419 | B2 | | 7/2013 | Holbrook et al. | | |

(Continued)

FOREIGN PATENT DOCUMENTS

DE 102006050708 A1 5/2008
EP 3297095 A1 3/2018
(Continued)

OTHER PUBLICATIONS

"Extended European Search Report mailed on Dec. 21, 2022", 18 pages.

*Primary Examiner* — Gary F Paumen
(74) *Attorney, Agent, or Firm* — Billion & Armitage (57) ABSTRACT

A bus bar assembly includes a bus bar formed of a first electrically conductive material having a planar contact portion. The bus bar defines a first bore extending through the contact portion. The bus bar assembly further includes a contact insert formed of a second electrically conductive material that has a greater hardness than the first electrically conductive material. The contact insert defines a first surface that is mechanically and electrically connected to the contact portion of the bus bar. The contact insert defines a second surface this is plated with a third electrically conductive material which is different than the second electrically conductive material. The contact insert defines a smooth second bore coaxial with the first bore and extending from the first surface to the second surface.

17 Claims, 11 Drawing Sheets

(56) References Cited

U.S. PATENT DOCUMENTS

| | | | | |
|---|---|---|---|---|
| 2015/0133005 A1* | 5/2015 | Saka | ........................ | C25D 7/00 |
| | | | | 439/887 |
| 2015/0236439 A1* | 8/2015 | Okubo | .................... | C25D 5/10 |
| | | | | 439/886 |
| 2016/0160321 A1* | 6/2016 | Ito | ........................ | C21D 9/0068 |
| | | | | 420/478 |
| 2016/0186294 A1* | 6/2016 | Maki | ........................ | C22C 9/02 |
| | | | | 428/673 |
| 2016/0254608 A1* | 9/2016 | Takahashi | ................ | C25D 3/38 |
| | | | | 439/886 |
| 2018/0026385 A1* | 1/2018 | Kato | ..................... | H01R 13/03 |
| | | | | 439/886 |
| 2019/0131609 A1 | 5/2019 | Fukushima et al. | | |

FOREIGN PATENT DOCUMENTS

| | | |
|---|---|---|
| WO | 2013039043 A1 | 3/2013 |
| WO | 2020169295 A1 | 8/2020 |

\* cited by examiner

FIG. 12

BUS BAR ASSEMBLY WITH PLATED ELECTRICAL CONTACT SURFACE

CROSS REFERENCE TO RELATED APPLICATIONS

This application claims the benefit of priority to U.S. Provisional Patent Application No. 63/226,925 filed on Jul. 29, 2021, and U.S. Provisional Patent Application No. 63/270,670 filed on Oct. 22, 2021, the entire disclosure of each of which is hereby incorporated by reference.

TECHNICAL FIELD

This provisional patent application is directed to a bus bar assembly with a plated electrical contact surface.

BACKGROUND

The resistance of an electrical connection to an electrical bus bar is reduced and stabilized by plating an electrically conductive material, such as tin or silver, on the contact portion of the bus bar. The plating material may be applied directly to the contact area of the bus bar. However, directly plating the bus bar has several drawbacks in processing cost. Selectively plating the contact portion requires specialized tooling and additional processing which increases production costs. Plating the entire bus bar is a simpler process but requires more of the costlier tin or silver-plating materials. Therefore, a bus bar with a lower cost plated electrical contact surface remains desired.

SUMMARY

According to one or more aspects of the present disclosure, a bus bar assembly includes a bus bar formed of a first electrically conductive material having a planar contact portion. The bus bar defines a first bore extending through the contact portion. The bus bar assembly further includes a contact insert that is formed of a second electrically conductive material that has a greater hardness than the first electrically conductive material. The contact insert defines a first surface that is mechanically and electrically connected to the contact portion of the bus bar. The contact insert also defines a second surface plated with a third electrically conductive material different than the second electrically conductive material. The contact insert additionally defines a smooth second bore coaxial with the first bore and extending from the first surface to the second surface.

In one or more embodiments of the bus bar assembly according to the previous paragraph, an annular ring on the second surface around the second bore is plated.

In one or more embodiments of the bus bar assembly according to any one of the previous paragraphs, the third electrically conductive material is silver or tin.

In one or more embodiments of the bus bar assembly according to any one of the previous paragraphs, the first bore has a generally cylindrical shape.

In one or more embodiments of the bus bar assembly according to any one of the previous paragraphs, the contact insert has a generally cylindrical shape.

In one or more embodiments of the bus bar assembly according to any one of the previous paragraphs, the contact insert defines a cylindrical collar extending from the second surface and defining an annular groove therein. The collar is in an interference fit with an inner wall of the first bore such that a portion of the bus bar is deformed and disposed within the annular groove.

In one or more embodiments of the bus bar assembly according to any one of the previous paragraphs, the collar includes a lip extending over the groove.

In one or more embodiments of the bus bar assembly according to any one of the previous paragraphs, a diameter of the lip is less than a diameter of the collar.

In one or more embodiments of the bus bar assembly according to any one of the previous paragraphs, the second surface defines a plurality of alternating projections and indentations radially extending from the collar.

In one or more embodiments of the bus bar assembly according to any one of the previous paragraphs, the bus bar defines a cylindrical indentation in the contact portion surrounding the first bore.

In one or more embodiments of the bus bar assembly according to any one of the previous paragraphs, the bus bar defines a cylindrical indentation in the contact portion surrounding the first bore. An outer surface of the contact located intermediate the first and second surfaces defines a plurality of serrations extending from the outer surface. this plurality of serrations in an interference fit with the indentation such that a portion of the bus bar is deformed and disposed between the plurality of serrations.

In one or more embodiments of the bus bar assembly according to any one of the previous paragraphs, the plurality of serrations is non-parallel to an axis of the second bore and are non-perpendicular to the axis of the second bore.

In one or more embodiments of the bus bar assembly according to any one of the previous paragraphs, the second surface defines a plurality of alternating projections and indentations radially extending from the second bore.

In one or more embodiments of the bus bar assembly according to any one of the previous paragraphs, the first surface of the contact insert is welded to the contact portion of the bus bar.

In one or more embodiments of the bus bar assembly according to any one of the previous paragraphs, the contact insert defines a cylindrical collar extending from the second surface and defining a plurality of serrations therein. The collar is in an interference fit with an inner wall of the first bore such that a portion of the bus bar is deformed and disposed within the plurality of serrations.

In one or more embodiments of the bus bar assembly according to any one of the previous paragraphs, plurality of serrations extends along the collar is a direction parallel to an axis of the second bore.

In one or more embodiments of the bus bar assembly according to any one of the previous paragraphs, the collar and the second bore have an obround cylindrical shape.

According to one or more aspects of the present disclosure, a method of manufacturing a bus bar assembly includes the steps of:
  providing a bus bar formed of a first electrically conductive material having a planar contact portion and defining a smooth first bore extending through the contact portion;
  providing a contact insert formed of a second electrically conductive material that has a greater hardness than the first electrically conductive material, the contact insert defining a first surface and a second surface opposite the first surface that is plated with a third electrically conductive material different than the second electrically conductive material and defining a smooth second bore;

arranging the contact insert on the contact portion such that the second bore is coaxial with the first bore; and mechanically and electrically attaching the first surface of the contact insert to the contact portion of the bus bar.

In one or more embodiments of the method according to the previous paragraph, the method further includes the steps of inserting an alignment tool within the second bore of the contact insert;

aligning an axis of the second bore with an axis of the first bore using the alignment tool; and attaching the contact insert to the contact portion using a welding process.

In one or more embodiments of the method according to any one of the previous paragraphs, the welding process is selected from a list consisting of sonic welding, laser welding, resistance welding, spin welding, brazing, and soldering processes.

In one or more embodiments of the method according to any one of the previous paragraphs, the welding process is a torsional sonic welding process.

In one or more embodiments of the method according to any one of the previous paragraphs, the contact insert defines a cylindrical collar extending from the second surface and defining an annular groove therein. The method further includes the step of forming an interference fit between a collar extending from the contact insert and an inner wall of the first bore such that a portion of the bus bar is deformed and disposed within an annular groove.

In one or more embodiments of the method according to any one of the previous paragraphs, the bus bar defines a cylindrical indentation in the contact portion surrounding the first bore. An outer surface of the contact located intermediate the first and second surfaces defines a plurality of serrations extending from the outer surface. The method further additionally includes the step of forming an interference fit between a plurality of serrations on an outer edge of the contact insert and the first bore such that a portion of the bus bar is deformed and disposed between the plurality of serrations.

DESCRIPTION OF THE DRAWINGS

The present invention will now be described, by way of example with reference to the accompanying drawings, in which.

DETAILED DESCRIPTION

Figure 1:
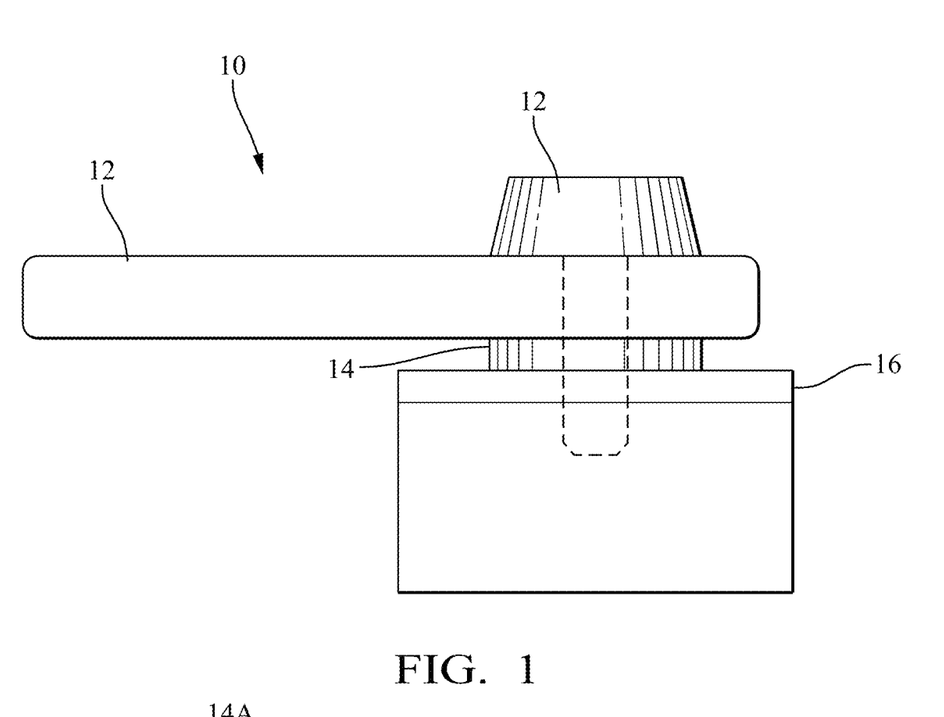
FIG. 1 shows a side view of a bus bar assembly including an electrical contact insert according to some embodiments.

FIG. 1 illustrates a non-limiting example of a bus bar assembly 10. The bus bar assembly includes a bus bar 12. A bus bar 12 is a bar or strip formed of a solid electrically conductive metal, e.g., a copper or aluminum-based alloy that is configured to carry high electrical currents, e.g., more than 100 amperes. Bus bars are typically used in high power electrical applications such as power stations, industrial power distributions, and electrical vehicles. The bus bar assembly 10 also includes an electrical contact insert, hereinafter referred to as the insert 14, that is configured to provide a mechanical and electrical connection feature between the bus bar 12 and an electrical device 16, such as a battery or electric motor. The insert 14 is a formed piece of conductive copper material that has a greater hardness than the bus bar.

A first example of an insert 14A is shown in FIGS. 2A-5B. The insert 14A has a cylindrical shape with a smooth through hole or bore 18 through the center of the insert 14A that is configured to receive a fastener 20, such as a bolt or threaded stud, to attach the bus bar assembly 10 to the electrical device 16. The insert 14A may be used in bolted connections where a plated contact surface between the bus bar 12 and the electrical device 16 is desired. The insert 14A is plated with an electrically conductive metallic material such as tin or silver, preferably only on a device contact surface 22 which is the bottom surface as shown in FIG. 2A, FIG. 2C, FIG. 3A, and FIGS. 4-5B. The smooth bore 18 allows the fastener 20 to easily pass through and avoids potential cross-threading issues that may occur with a threaded through hole.

This insert 14A also includes a collar 24 that protrudes from a bus bar contact surface 26 which is arranged generally opposite the device contact surface 22 is shown as the top surface of the insert 14A in FIG. 2A, FIG. 2C, FIG. 3A, and FIGS. 4-5B. The collar 24 has an annular groove 28 that defines stepped surfaces or levels around the perimeter of the collar 24.

Figure 2A:
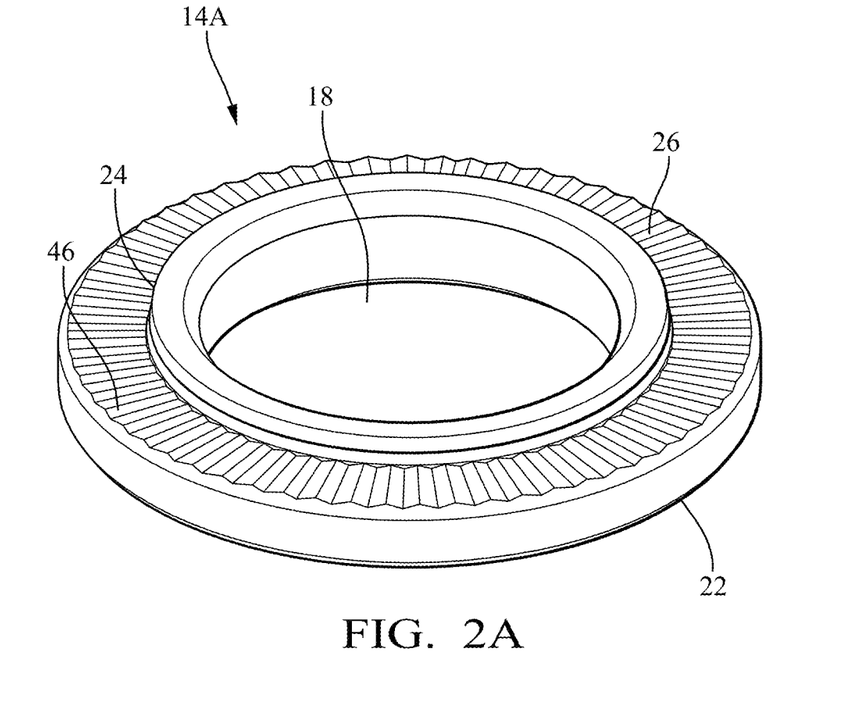
FIG. 2A shows a perspective view of an electrical contact insert according to some embodiments.
Figure 2B:
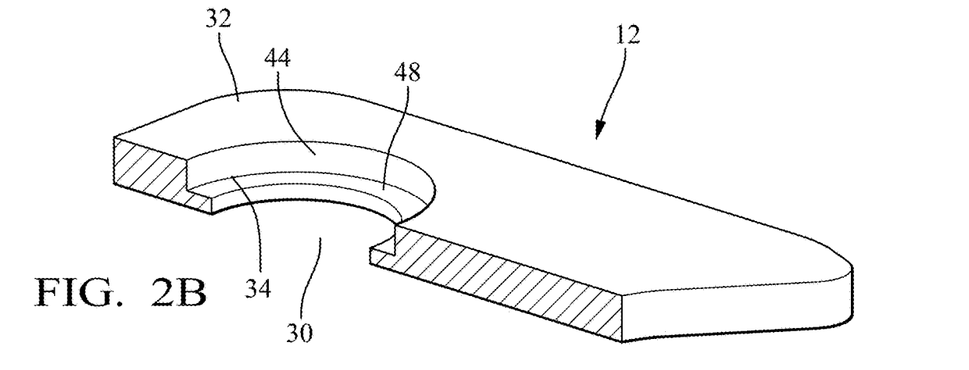
FIG. 2B shows a cross section perspective view of a bus bar of the bus bar assembly according to some embodiments.
Figure 2C:
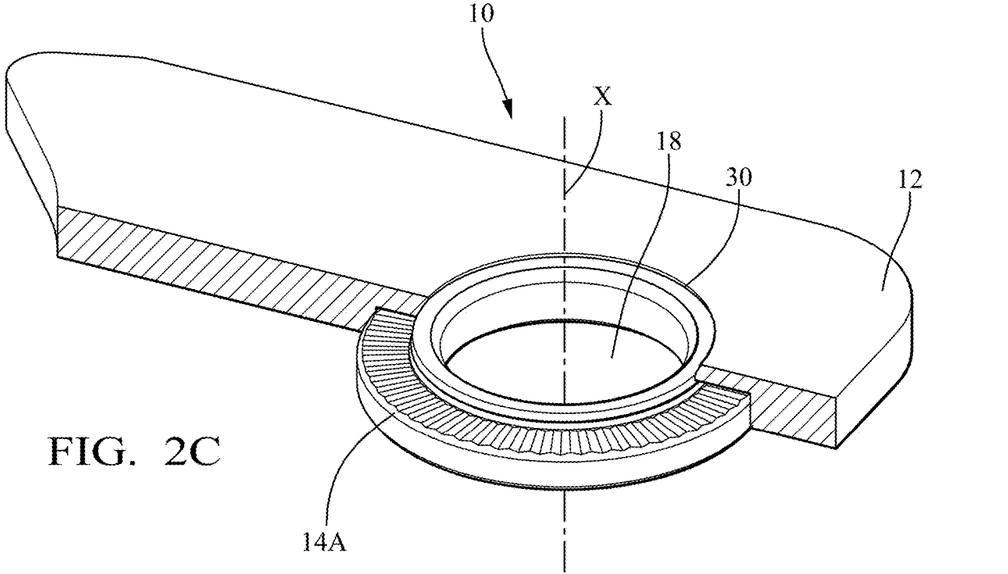
FIG. 2C shows an assembly view of the electrical contact insert of FIG. 2A and the bus bar of FIG. 2B according to some embodiments.
Figure 2D:
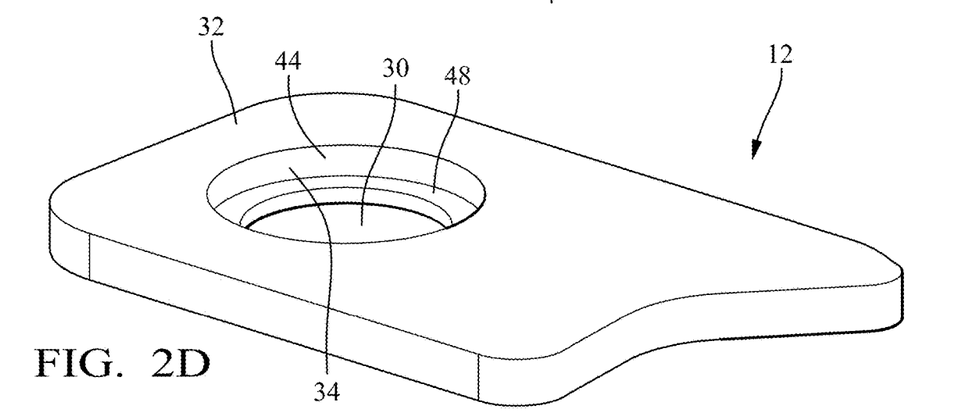
FIG. 2D shows a perspective view of the bus bar of FIG. 2B according to some embodiments.
Figure 5A:
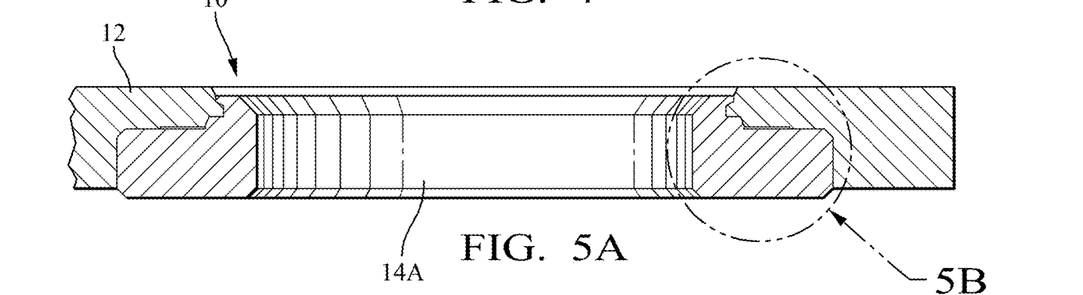
FIG. 5A is a cross section view of a bus bar assembly according to some embodiments.
Figure 5B:
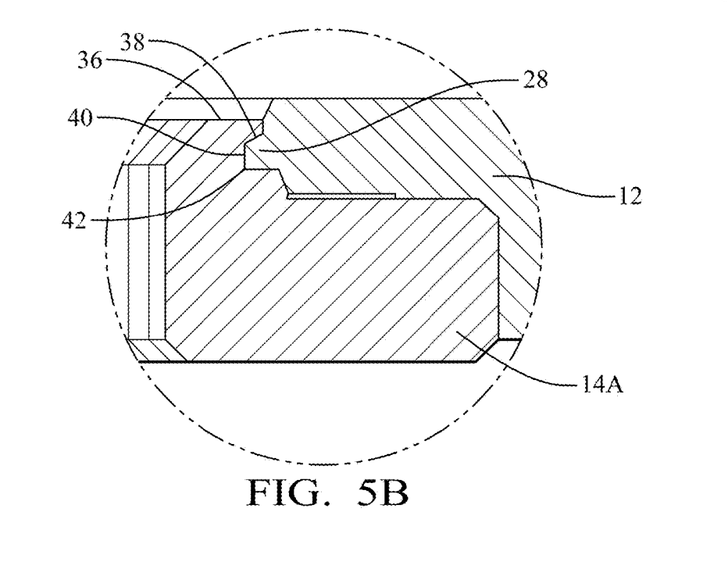
FIG. 5B is a close-up cross section view of a bus bar assembly according to some embodiments.

As can be seen in FIGS. 2B and 2D, the bus bar 12 also has a cylindrical through hole or bore 30 extending through a contact portion 32 of the bus bar 12. The bus bar 12 also defines a cylindrical indentation 34 that surrounds the bus bar bore 30 and is coaxial with the bus bar bore 30. The collar 24 and the indentation 34 are sized such that they are in an interference or press fit condition when the collar 24 is inserted within the indentation 34. The annular groove 28 includes a lip 36 extending over the groove 28, thereby forming a top edge 38, an inner edge 40, and a bottom edge 42 within the groove 28. As can be seen in FIG. 5A, diameter of the lip 36 is less than a diameter of the collar 24. The top edge 38 is non-perpendicular to the inner edge 40 and non-parallel to the bottom edge 42. As shown in FIGS. 5A and 5B, as the collar 24 of the insert 14A is pressed into the indentation 34, the side walls 44 of the indentation 34 in the bus bar 12 are deformed with at least some the material displaced from the side walls 44 entering and preferably filling the groove 28 in the collar 24, thereby securing the insert 14A within the indentation 34.

Figure 3A:
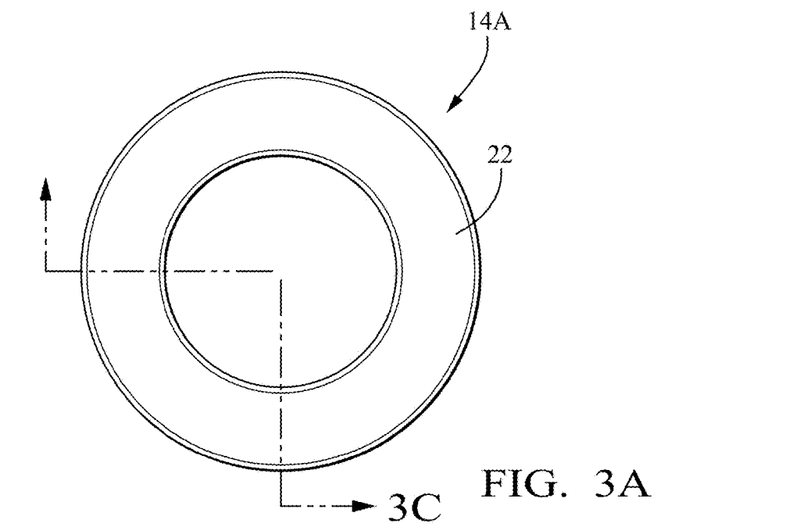
FIG. 3A shows a bottom view of the electrical contact insert of FIG. 2A according to some embodiments.
Figure 3B:
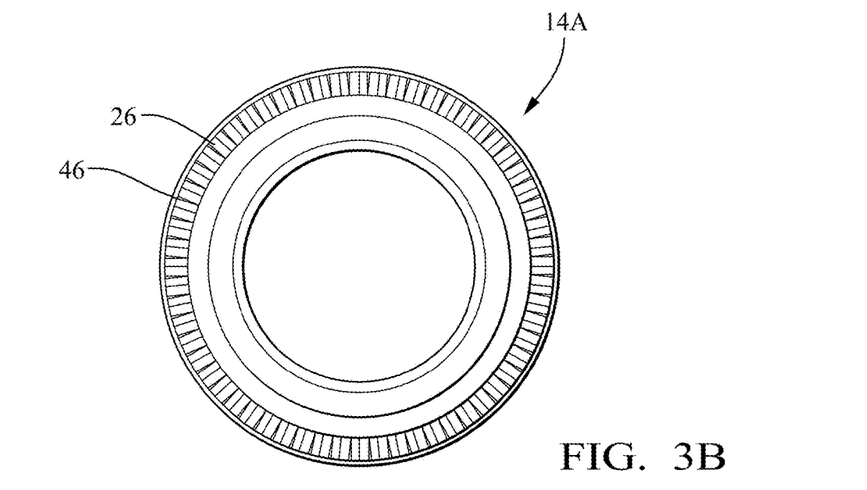
FIG. 3B shows a top view of the electrical contact insert of FIG. 2A according to some embodiments.
Figure 3C:
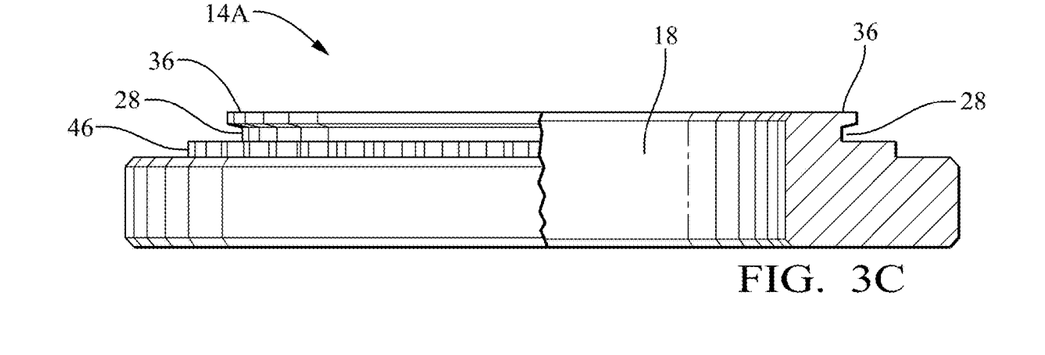
FIG. 3C shows a partial cross section side view of the electrical contact insert of FIG. 2A according to some embodiments.
Figure 4:
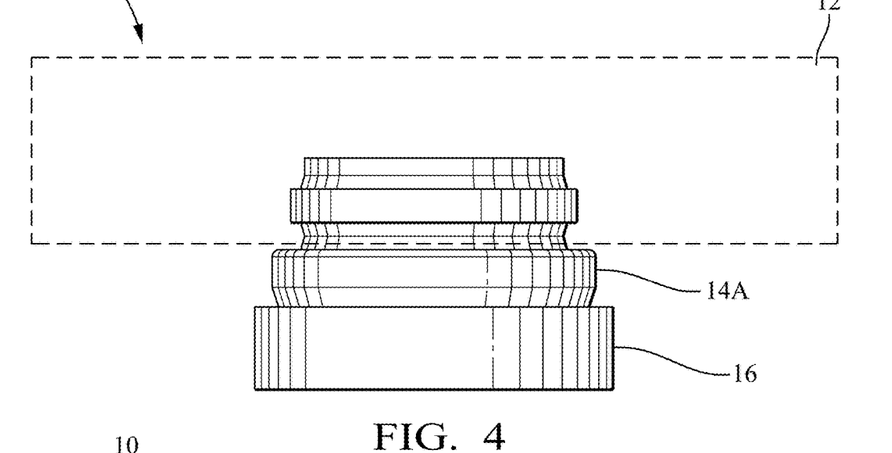
FIG. 4 shows a side view of a bus bar assembly according to some embodiments.

The device contact surface 22 also defines a plurality of alternating projections and indentations 46 that radially extend from the collar 24. This plurality of alternating projections and indentations 46 displaces some of the material on the bottom surface 48 of the indentation 34, thereby inhibiting the insert 14A from twisting within the indentation 34 when a torquing force is applied to the bus bar assembly 10, e.g., by the treaded fastener 20 within the bore 18 of the insert 14A.

Figure 6A:
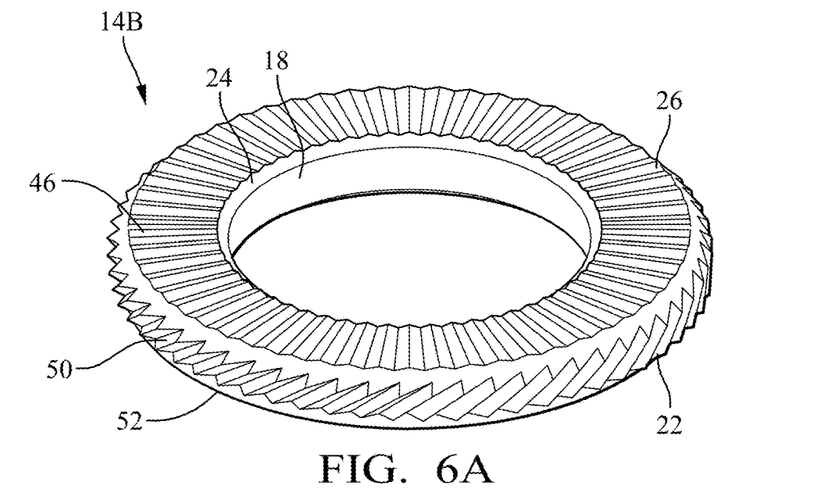
FIG. 6A shows a perspective view of an electrical contact insert according to some embodiments.
Figure 6B:
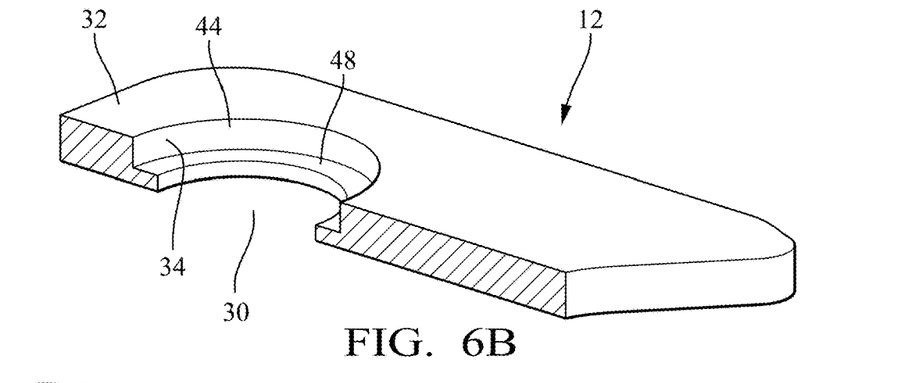
FIG. 6B shows a cross section perspective view of a bus bar of the bus bar assembly according to some embodiments.
Figure 6C:
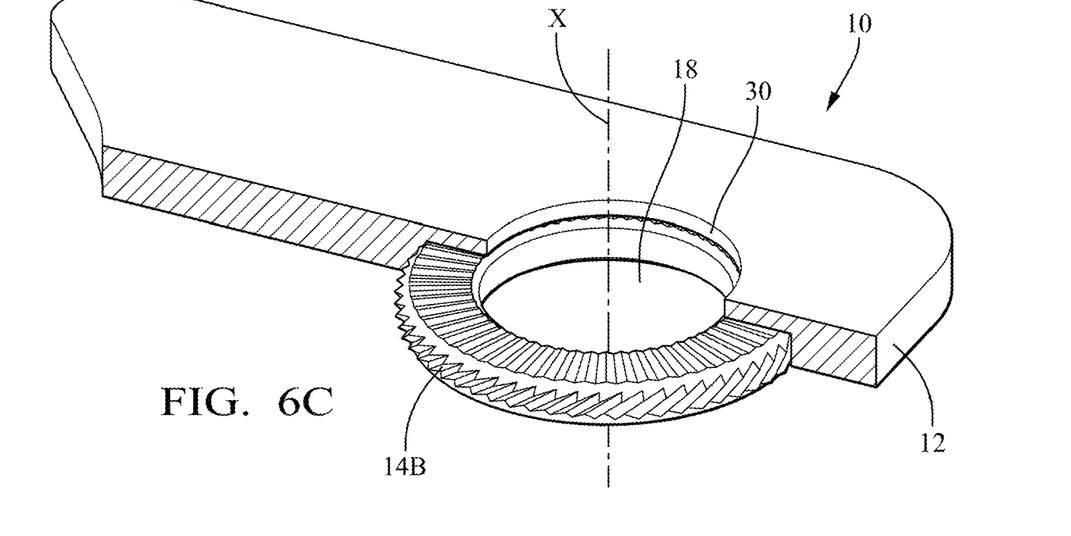
FIG. 6C shows an assembly view of the electrical contact insert of FIG. 6A and the bus bar of FIG. 6B according to some embodiments.
Figure 6D:
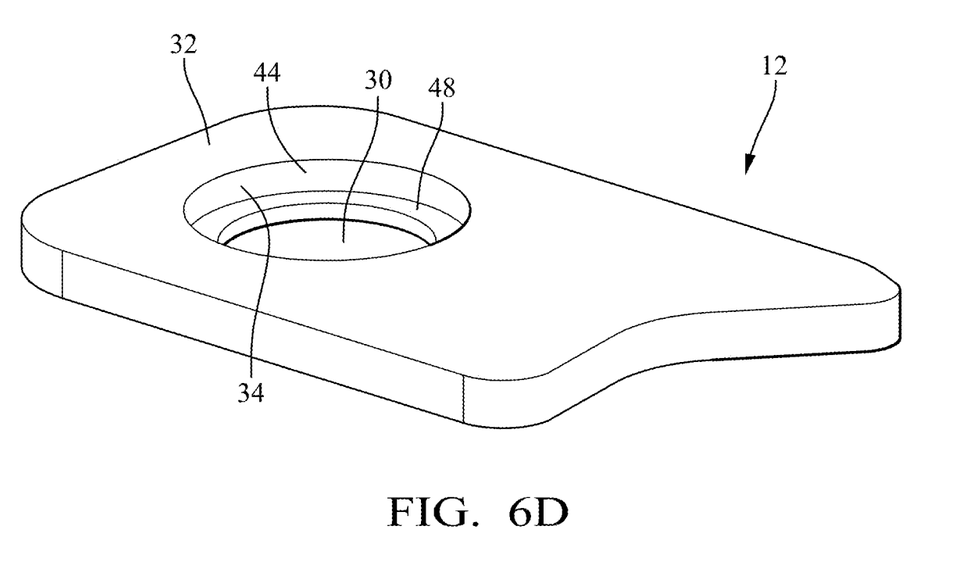
FIG. 6D shows a perspective view of the bus bar of FIG. 6B according to some embodiments.
Figure 7:
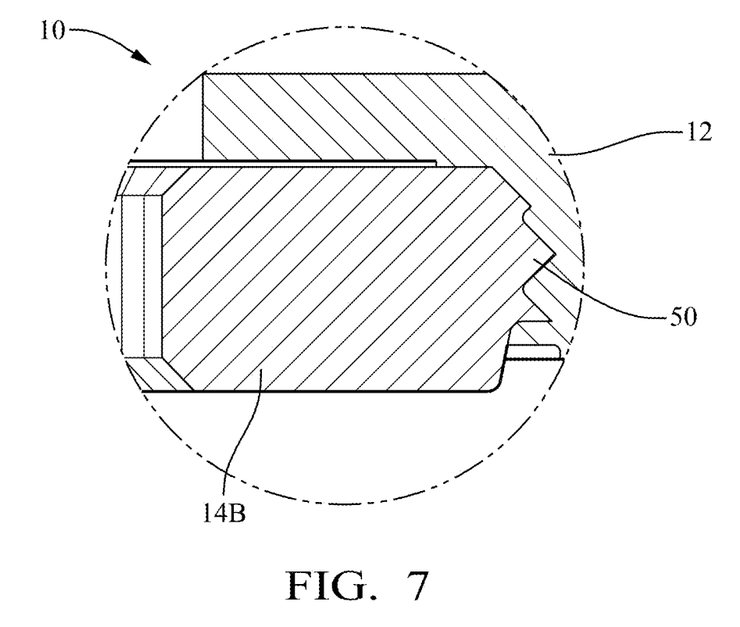
FIG. 7 is a close-up cross section view of a bus bar assembly according to some embodiments.

A second example of an insert 14B is shown in FIGS. 6A-7. This insert also has a cylindrical shape with a smooth through hole or bore 18 through the center of the insert 14B that is configured to receive a fastener 20, such as a bolt or threaded stud, to attach the bus bar assembly 10 to the electrical device 16. The insert 14B may be used in bolted connections where a plated contact surface between the bus bar 12 and the electrical device 16 is desired. The insert 14B is plated with an electrically conductive metallic material such as tin or silver, preferably only on a device contact surface 22 which is the bottom surface as shown in FIG. 6A, FIG. 6C, and FIG. 7. The smooth bore 18 allows the fastener 20 to easily pass through and avoids potential cross-threading issues that may occur with a threaded through hole.

The insert 14B defines a plurality of serrations 50 that protrudes from an outer edge 52 of the insert 14B. The plurality of serrations 50 is arranged at an angle on the outer edge 52 of the insert 14B such that it is both non-parallel and non-perpendicular to an axis X of the bore 18 in the insert 14B.

As can be seen in FIGS. 6B and 6D, the bus bar 12 also has a cylindrical through hole or bore 30 extending through a contact portion 32 of the bus bar 12. The bus bar 12 also defines a cylindrical indentation 34 that surrounds the bus bar bore 30 and is coaxial with the bus bar bore 30. The plurality of serrations 50 and the indentation 34 are sized such that they are in an interference or press fit condition when the insert 14B is placed within the indentation 34. As shown in FIGS. 5A and 5B, as the insert 14B is pressed into the indentation 34, the side walls 44 of the indentation 34 in the bus bar 12 are deformed by the plurality of serrations 50 with at least some the material displaced from the side walls 44 entering and preferably filling spaces between the serrations 50, thereby securing the insert 14B within the indentation 34. In addition, the angled plurality of serrations 50 causes the insert 14B to rotate slightly as the insert 14B is pressed into the indentation 34.

The plurality of serrations 50 has sharp edges that provide broaching features that break through surface oxides on the bus bar 12 to improve electrical performance and mechanical retention.

The device contact surface 22 also defines a plurality of alternating projections and indentations 46 in a bus bar contact surface 26 which is arranged generally opposite the device contact surface 22 which is shown as the top surface of the insert in FIG. 6A, FIG. 6C, and FIG. 7. The plurality of alternating projections and indentations 46 radially extend from the bore 18. This plurality of alternating projections and indentations 46 displace some of the material on the bottom surface 48 of the indentation 34, thereby inhibiting the insert 14B from twisting within the indentation 34 when a torquing force is applied to the bus bar assembly 10, e.g., by the treaded fastener 20 within the bore 18 of the insert 14B.

While the preceding examples of the bus bar 12 show a bore 18 extending through the bus bar 12 surrounded by an indentation 34, alternative embodiments of a bus bar may only have a bore extending with a uniform diameter through the count portion and the collar or serrations may deform the inner wall of the bore to secure the insert to the bus bar.

Figure 8A:
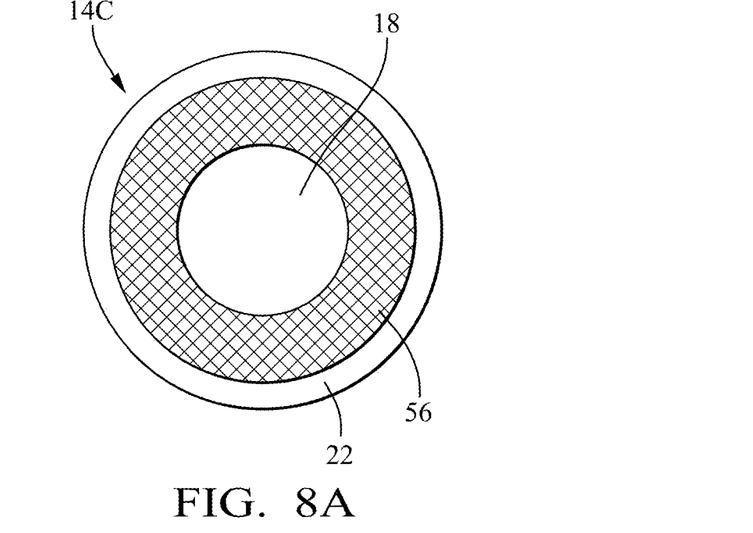
FIG. 8A is a top view of an electrical contact insert according to some embodiments.
Figure 8B:
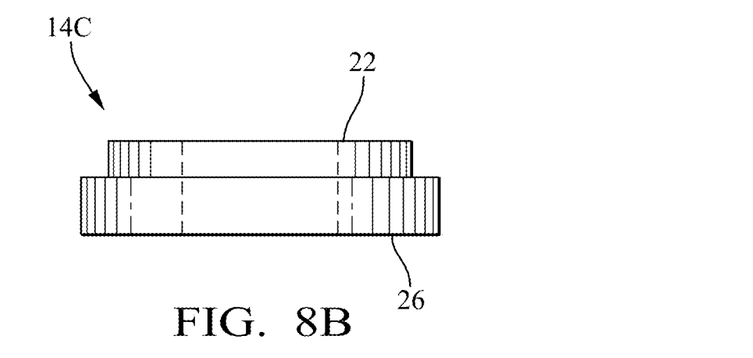
FIG. 8B is a side view of an electrical contact insert according to some embodiments.
Figure 8C:
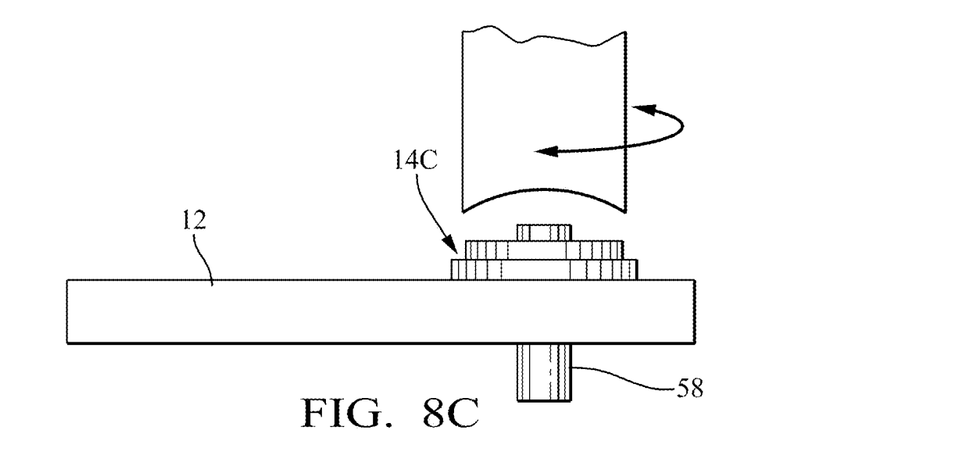
FIG. 8C is a side view of a process of attaching the contact insert of FIGS. 8A and 8B to a bus bar according to some embodiments.

A third example of an insert 14C is shown in FIGS. 8A-8C. The insert 14C also has a cylindrical shape with a smooth through hole or bore 18 through the center of the insert 14C that is configured to receive a fastener 20, such as a bolt or threaded stud, to attach the bus bar assembly 10 to the electrical device 16. The insert 14C may be used in bolted connections where a plated contact surface between the bus bar 12 and the electrical device 16 is desired. The insert 14C is plated with an electrically conductive metallic material such as tin or silver, preferably only on an inner portion 56 of a device contact surface 22 which is the top surface as shown in FIGS. 8A-8C. The smooth bore 18 allows the fastener 20 to easily pass through and avoids potential cross-threading issues that may occur with a threaded through hole.

A bus bar contact surface 26 of the insert 14C is generally flat and is welded to a contact portion 32 of the bus bar 12 thereby mechanically and electrically connecting the insert 14C to the contact portion 32 of the bus bar 12. The welding is preferably performed using a tortional sonic welding process, However, other sonic welding, laser welding, resistance welding, spin welding, brazing, or soldering processes may also be used in some applications of the bus bar. The welding the insert 14C to the contact portion 32 also inhibits the insert 14C from twisting when a torquing force is applied to the bus bar assembly 10, e.g., by a treaded fastener 20 within the bore 18 of the insert 14C.

Figure 9A:
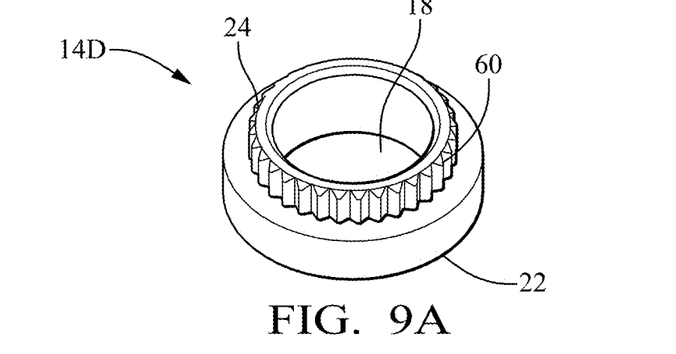
FIGS. 9A to 9C are perspective views of electrical contact inserts according to some embodiments.
Figure 9B:
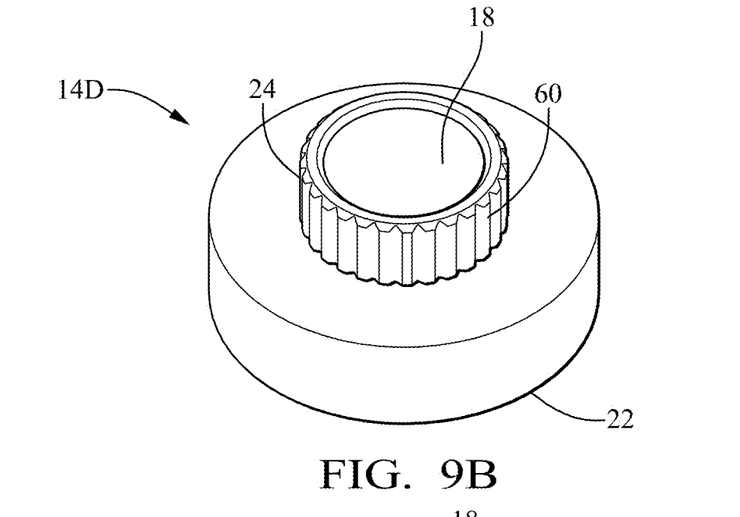
Figure 9C:
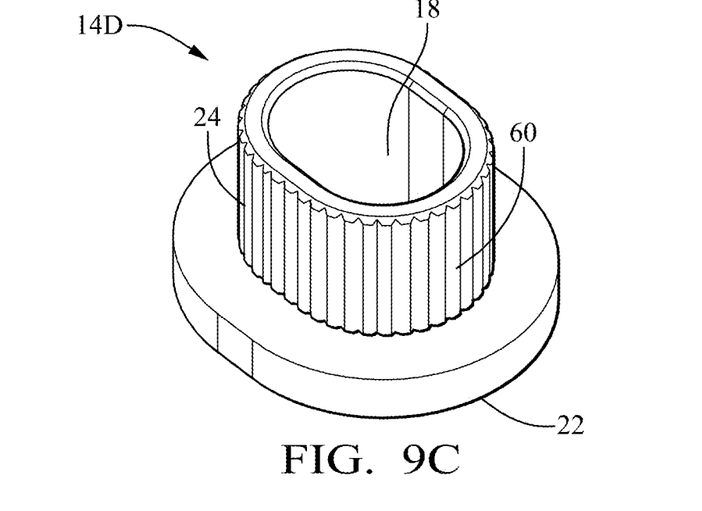
Figure 10A:
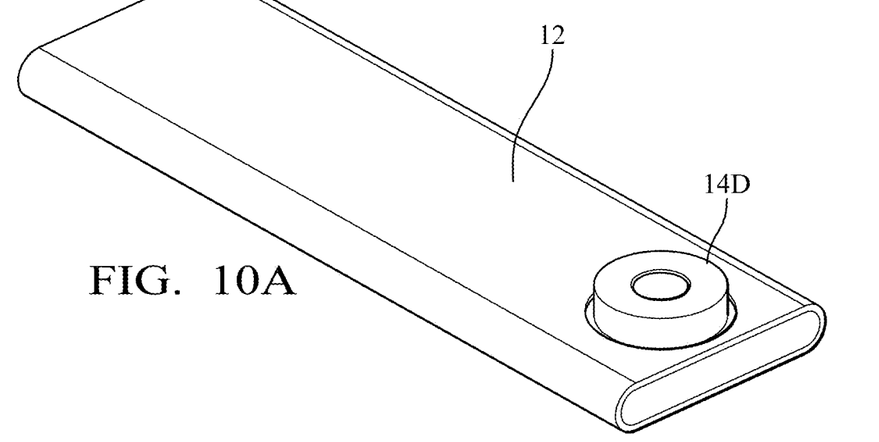
FIGS. 10A to 10C are perspective views of bus bar assemblies including electrical contact inserts of FIG. 9A to 9C according to some embodiments.
Figure 10B:
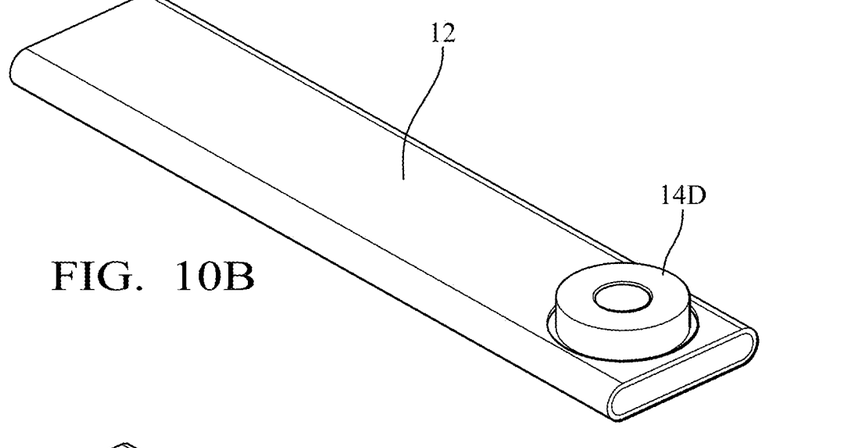
Figure 10C:
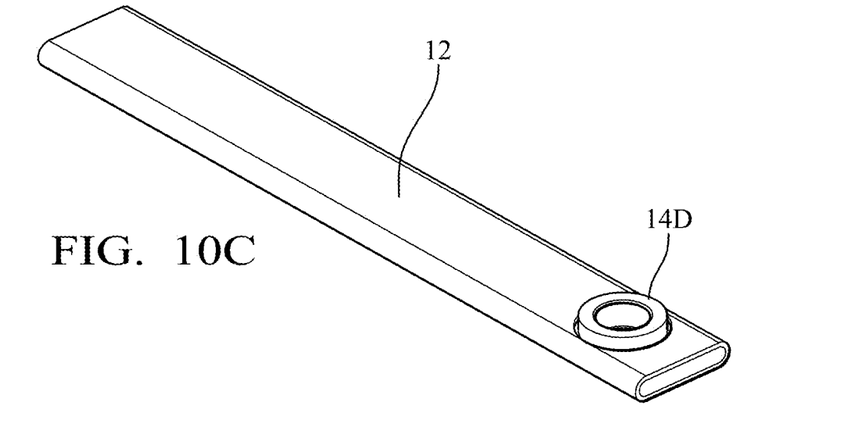

A fourth example of an insert 14D is shown in FIGS. 9A-9C. The insert 14D has a round or obround cylindrical shape with a smooth through hole or bore 18 through the center of the insert 14D that is configured to receive a fastener 20, such as a bolt or threaded stud, to attach the bus bar assembly 10 to the electrical device 16. The bore may also have a round or obround shape. An outer surface of the collar 18 defines a plurality of serrations 60 that extend in a direction generally parallel to the bore 18. The plurality of serrations 60 are sized such that they are in an interference or press fit condition when the insert 14D is placed within the bus bar bore 30. As shown in FIGS. 10A-10C, the insert 14D is pressed into the bus bar bore 30, the side walls of the bus bar bore 30 are deformed by the plurality of serrations 60 with at least some the material displaced from the side walls entering and preferably filling spaces between the serrations 60, thereby securing the insert 14D within the bus bar bore 30. The plurality of serrations 60 has sharp edges that provide broaching features that break through surface oxides in the bus bar bore 30 to improve electrical performance and mechanical retention.

Figure 11A:
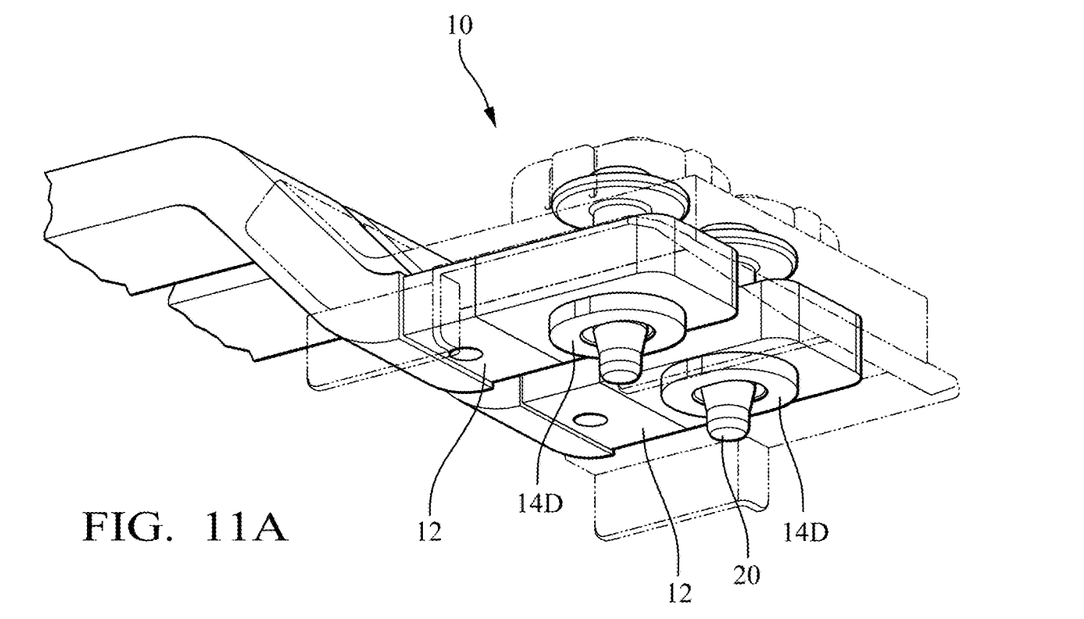
FIG. 11A is a perspective view of bus bar assemblies including the electrical contact inserts of FIG. 9A to 9C according to some embodiments.
Figure 11B:
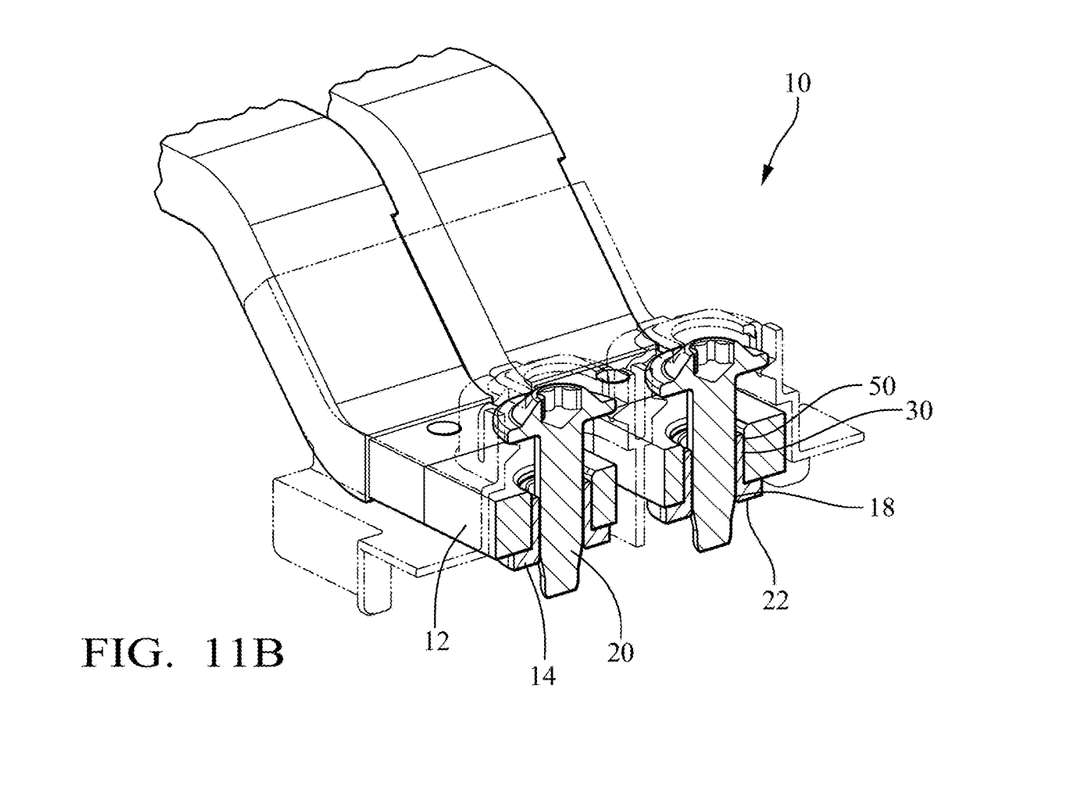
FIG. 11B is a cross section view of the bus bar assemblies of FIG. 11A according to some embodiments.

The insert 14D may be used in bolted connections, as shown in FIGS. 11A and 11B, where a plated contact surface between the bus bar 12 and the electrical device 16 is desired. The smooth bore 18 allows the fastener 20 to easily pass through and avoids potential cross-threading issues that may occur with a threaded through hole.

The insert 14D may be mechanically pressed into the bus bar bore 30 to provide a friction fit or may be torsionally welded to the bus bar 12.

Figure 12:
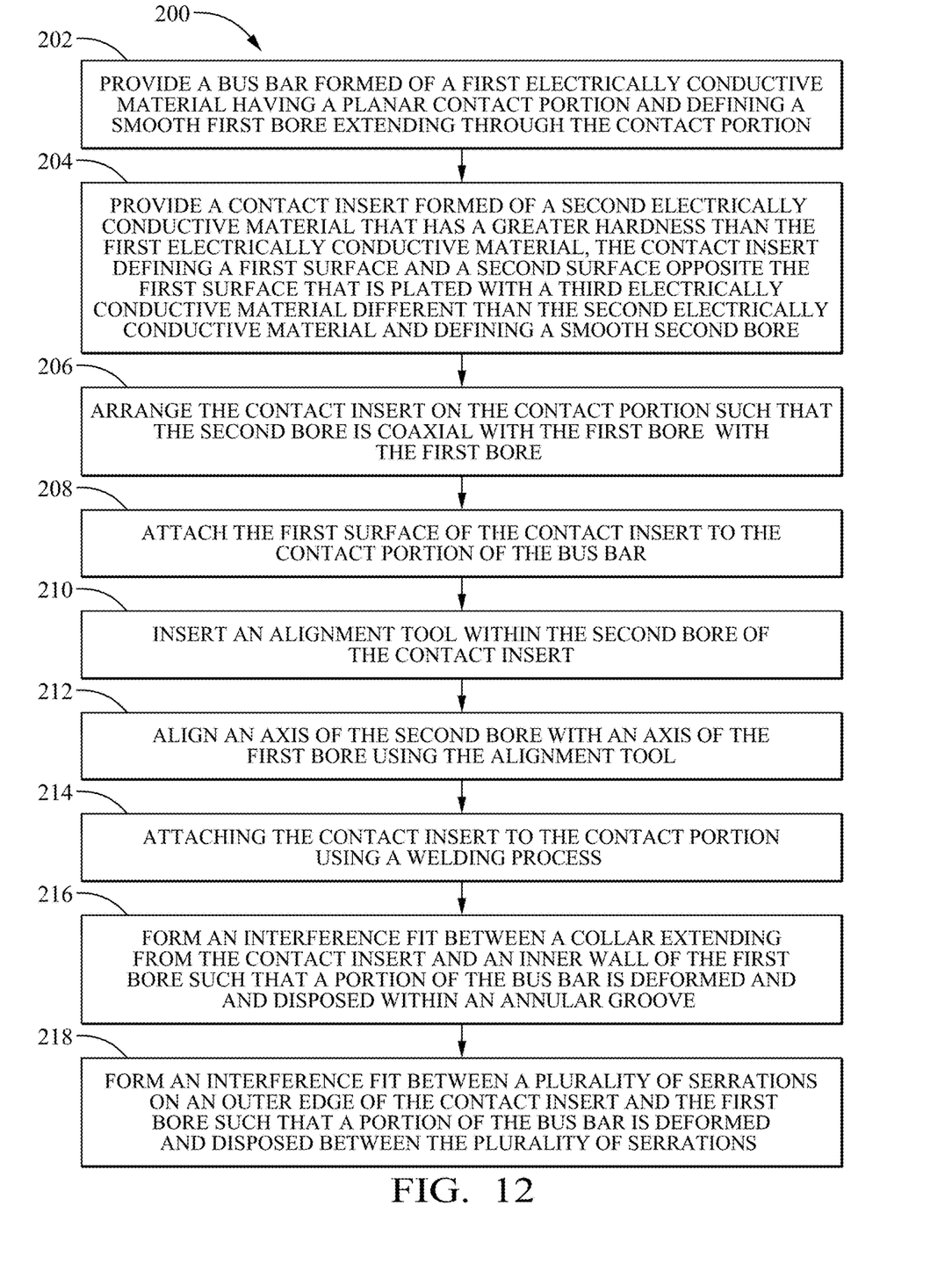
FIG. 12 is a flow chart of a method of manufacturing a bus bar assembly according to some embodiments.

FIG. 12 shows a method 200 of manufacturing a bus bar assembly, such as the bus bar assembly 10 described above. The method 200 includes the following steps:

STEP 202, PROVIDE A BUS BAR FORMED OF A FIRST ELECTRICALLY CONDUCTIVE MATERIAL HAVING A PLANAR CONTACT PORTION AND DEFINING A SMOOTH FIRST BORE EXTENDING THROUGH THE CONTACT PORTION, includes providing a bus bar 12 formed of a first electrically conductive material having a planar contact portion 32 and defining a smooth first bore 30 extending through the contact portion 32 as shown in FIGS. 2B, 2D, 6B, and 6D;

STEP 204, PROVIDE A CONTACT INSERT FORMED OF A SECOND ELECTRICALLY CONDUCTIVE MATERIAL THAT HAS A GREATER HARDNESS THAN THE FIRST ELECTRICALLY CONDUCTIVE MATERIAL, THE CONTACT INSERT DEFINING A FIRST SURFACE AND A SECOND SURFACE OPPOSITE THE FIRST SURFACE THAT IS PLATED WITH A THIRD ELECTRICALLY CONDUCTIVE MATERIAL DIFFERENT THAN THE SECOND ELECTRICALLY CONDUCTIVE MATERIAL AND DEFINING A SMOOTH SECOND BORE, includes providing a contact insert 14 formed of a second electrically conductive material that has a greater hardness than the first electrically conductive material. The contact insert 14 defines a first surface 26 and a second surface 22 opposite the first surface 26 that is plated with a third electrically conductive material that is different than the second electrically conductive material. The contact insert 14 defines a smooth second bore 18 extending therethrough as shown in FIG. 1;

STEP 206, ARRANGE THE CONTACT INSERT ON THE CONTACT PORTION SUCH THAT THE SECOND BORE IS COAXIAL WITH THE FIRST BORE, includes arranging the contact insert 14 on the contact portion 32 such that the second bore 18 is coaxial with the first bore 30 as shown in FIG. 1;

STEP 208, ATTACH THE FIRST SURFACE OF THE CONTACT INSERT TO THE CONTACT PORTION OF THE BUS BAR, includes attaching the first surface 26 of the contact insert 14 to the contact portion 32 of the bus bar 12 as shown in FIG. 1;

STEP 210, INSERT AN ALIGNMENT TOOL WITHIN THE SECOND BORE OF THE CONTACT INSERT, is an optional step that includes inserting an alignment tool 58 within the second bore 18 of the contact insert 14C as shown in FIG. 8C;

STEP 212, ALIGN AN AXIS OF THE SECOND BORE WITH AN AXIS OF THE FIRST BORE USING THE ALIGNMENT TOOL, is an optional step that includes aligning an axis X of the second bore 18 with an axis X of the first bore 30 using the alignment tool 58 as shown in FIG. 8C;

STEP 214, ATTACH THE CONTACT INSERT TO THE CONTACT PORTION USING A WELDING PROCESS, is an optional process that includes attaching the contact insert 14C to the contact portion 32 using a welding process as shown in FIG. 8C. The welding process may be laser welding, resistance welding, spin welding, brazing, soldering, or sonic welding, and is preferably a torsional sonic welding process;

STEP 216, FORM AN INTERFERENCE FIT BETWEEN A COLLAR EXTENDING FROM THE CONTACT INSERT AND AN INNER WALL OF THE FIRST BORE SUCH THAT A PORTION OF THE BUS BAR IS DEFORMED AND DISPOSED WITHIN AN ANNULAR GROOVE, is an optional step that includes forming an interference fit between a collar 18 of a contact insert 14A and an inner wall 44 of an indentation portion 34 of the first bore 30 such that a portion of the bus bar 12 is deformed and disposed within an annular groove 28 defined in the collar 18, see FIGS. 5A and 5B; and STEP 218, FORM AN INTERFERENCE FIT BETWEEN A PLURALITY OF SERRATIONS ON AN OUTER EDGE OF THE CONTACT INSERT AND THE FIRST BORE SUCH THAT A PORTION OF THE BUS BAR IS DEFORMED AND DISPOSED BETWEEN THE PLURALITY OF SERRATIONS, is an optional step that includes forming an interference fit between the plurality of serrations 50 on an outer edge 52 of the contact insert 14B and an indentation portion 34 of the first bore 30 such that a portion of the bus bar 12 is deformed and disposed between the plurality of serrations 50, see FIG. 7.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any order of operations, direction or orientation unless stated otherwise.

The invention claimed is:

1. A bus bar assembly, comprising:
    a bus bar formed of a first electrically conductive material having a planar contact portion, wherein the bus bar defines a first bore extending through the contact portion; and
    a contact insert formed of a second electrically conductive material that has a greater hardness than the first electrically conductive material, wherein the contact insert defines a first surface that is mechanically and electrically connected to the contact portion of the bus bar and wherein the contact insert defines a second surface plated with a third electrically conductive material different than the second electrically conductive material, wherein the contact insert defines a smooth second bore coaxial with the first bore and extending from the first surface to the second surface, wherein the contact insert defines a cylindrical collar extending from the second surface and defining an annular groove therein, wherein the collar includes a lip extending over the annular groove, and wherein the second surface defines a plurality of alternating projections and indentations radially extending beyond the lip and the collar.

2. The bus bar assembly according to claim 1, wherein the collar is in an interference fit with an inner wall of the first bore such that a portion of the bus bar is deformed and disposed within the annular groove.

3. The bus bar assembly according to claim 1, wherein a diameter of the lip is less than a diameter of the collar.

4. The bus bar assembly according to claim 2, wherein the bus bar defines a cylindrical indentation in the contact portion surrounding the first bore.

5. The bus bar assembly according to claim 1, wherein the bus bar defines a cylindrical indentation in the contact portion surrounding the first bore, wherein an outer surface of the contact located intermediate the first and second surfaces defines a plurality of serrations extending from the outer surface, and wherein this plurality of serrations is in an interference fit with the indentation such that a portion of the bus bar is deformed and disposed between the plurality of serrations.

6. The bus bar assembly according to claim 5, wherein the plurality of serrations is non-parallel to an axis of the second bore and are non-perpendicular to the axis of the second bore.

7. The bus bar assembly according to claim 5, wherein the second surface defines a plurality of alternating projections and indentations radially extending from the second bore.

8. The bus bar assembly according to claim 1, wherein the first surface of the contact insert is welded to the contact portion of the bus bar.

9. The bus bar assembly according to claim 1, wherein the contact insert defines a cylindrical collar extending from the second surface and defining a plurality of serrations therein and wherein the collar is in an interference fit with an inner wall of the first bore such that a portion of the bus bar is deformed and disposed within the plurality of serrations.

10. The bus bar assembly according to claim 9, wherein the plurality of serrations extend along the collar is a direction parallel to an axis of the second bore.

11. The bus bar assembly according to claim 9, wherein the collar and the second bore have an obround cylindrical shape.

12. A method of manufacturing a bus bar assembly, comprising:
    providing a bus bar formed of a first electrically conductive material having a planar contact portion and defining a smooth first bore extending through the contact portion;
    providing a contact insert formed of a second electrically conductive material that has a greater hardness than the first electrically conductive material, the contact insert defining a first surface and a second surface opposite the first surface that is plated with a third electrically conductive material different than the second electrically conductive material and defining a smooth second bore, wherein the contact insert defines a cylindrical collar extending from the second surface and defining an annular groove therein, wherein the collar includes a lip extending over the annular groove, and wherein the second surface defines a plurality of alternating projections and indentations radially extending beyond the lip and the collar;
    arranging the contact insert on the contact portion such that the second bore is coaxial with the first bore; and
    mechanically and electrically attaching the first surface of the contact insert to the contact portion of the bus bar.

13. The method according to claim 12, further comprising:
    inserting an alignment tool within the second bore of the contact insert;

aligning an axis of the second bore with an axis of the first bore using the alignment tool; and attaching the contact insert to the contact portion using a welding process.

14. The method according to claim 13, wherein the welding process is selected from a list consisting of sonic welding, laser welding, resistance welding, spin welding, brazing, and soldering processes.

15. The method according to claim 13, wherein the welding process is a torsional sonic welding process.

16. The method according to claim 12, further comprising:

forming an interference fit between a collar extending from the contact insert and an inner wall of the first bore such that a portion of the bus bar is deformed and disposed within an annular groove.

17. The method according to claim 12, wherein the bus bar defines a cylindrical indentation in the contact portion surrounding the first bore, wherein an outer surface of the contact located intermediate the first and second surfaces defines a plurality of serrations extending from the outer surface, and wherein the method further comprises:

forming an interference fit between a plurality of serrations on an outer edge of the contact insert and the first bore such that a portion of the bus bar is deformed and disposed between the plurality of serrations.

* * * * *